(12) United States Patent
Iwakuni

(10) Patent No.: US 11,261,313 B2
(45) Date of Patent: *Mar. 1, 2022

(54) RUBBER COMPOSITION FOR TIRE TREAD AND PNEUMATIC TIRE

(71) Applicant: Toyo Tire Corporation, Itami (JP)

(72) Inventor: Keisuke Iwakuni, Itami (JP)

(73) Assignee: TOYO TIRE CORPORATION, Itami (JP)

(*) Notice: Subject to any disclaimer, the term of this patent is extended or adjusted under 35 U.S.C. 154(b) by 429 days.

This patent is subject to a terminal disclaimer.

(21) Appl. No.: 16/338,853

(22) PCT Filed: Nov. 8, 2017

(86) PCT No.: PCT/JP2017/040296
§ 371 (c)(1),
(2) Date: Apr. 2, 2019

(87) PCT Pub. No.: WO2018/100993
PCT Pub. Date: Jun. 7, 2018

(65) Prior Publication Data
US 2021/0277211 A1    Sep. 9, 2021

(30) Foreign Application Priority Data

Nov. 30, 2016 (JP) .............................. JP2016-232999

(51) Int. Cl.
*C08L 9/06* (2006.01)
*B60C 1/00* (2006.01)

(52) U.S. Cl.
CPC .............. *C08L 9/06* (2013.01); *B60C 1/0016* (2013.01); *C08L 2205/035* (2013.01)

(58) Field of Classification Search
CPC ..... C08L 9/06; C08L 2205/035; B60C 1/0016
See application file for complete search history.

(56) References Cited

U.S. PATENT DOCUMENTS

| | | | | |
|---|---|---|---|---|
| 10,472,501 B2 * | 11/2019 | Iwakuni | .................... | C08L 7/00 |
| 11,072,695 B2 * | 7/2021 | Iwakuni | ............. | B60C 11/0008 |
| 2013/0267640 A1 | 10/2013 | Lopez et al. | | |
| 2016/0090475 A1 * | 3/2016 | Nakatani | .................. | C08L 9/06 |
| | | | | 524/526 |

FOREIGN PATENT DOCUMENTS

| | | |
|---|---|---|
| JP | 50-15882 A | 2/1975 |
| JP | 1-163228 A | 6/1989 |
| JP | 11-172048 A | 6/1999 |
| JP | 2000-247105 A | 9/2000 |
| JP | 2010-185025 A | 8/2010 |
| JP | 2010-209174 A | 9/2010 |

OTHER PUBLICATIONS

International Search Report dated Jan. 23, 2018, issued in counterpart International Application No. PCT/JP2017/040296 (1 page).

* cited by examiner

*Primary Examiner* — Angela C Scott
(74) *Attorney, Agent, or Firm* — Westerman, Hattori, Daniels & Adrian, LLP

(57) ABSTRACT

A rubber composition for a tire tread according to an embodiment includes a rubber component containing a natural rubber, a styrene-butadiene rubber, and a polybutadiene rubber; oil-absorbent polymer particles having a glass transition temperature of −70 to −20° C., formed from a polymer whose molecular weight distribution is less than 3.0, and having an oil absorption of 100 to 1,500 ml/100 g; an oil; and silica. The content of the oil-absorbent polymer particles is 0.5 to 25 parts by mass per 100 parts by mass of the rubber component. As a result, snow performance and wet performance can be improved.

9 Claims, No Drawings

RUBBER COMPOSITION FOR TIRE TREAD AND PNEUMATIC TIRE

TECHNICAL FIELD

The present invention relates to a rubber composition for a tire tread and also to a pneumatic tire using the same.

BACKGROUND ART

Conventionally, as tires for use in winter in Europe, for example, snow tires (also called "winter tires") are known. In a snow tire, together with running performance on a snow-covered road (i.e., snow performance), running performance on a wet road surface (i.e., wet performance) is also required. In order to improve both performances in a well-balanced manner, a proposal has been made (see PTL 1).

Incidentally, PTL 2 discloses that an oil gelling agent (e.g., N-lauroyl-L-glutamic acid-α,γ-di-n-butylamide) is added to an antioxidant, and the resulting gelled product is blended into a rubber composition. However, disclosed is a technology of using an oil gelling agent in order to improve the ozone cracking resistance of an antioxidant, and there is no disclosure of using oil-absorbent polymer particles considering snow performance or wet performance.

Meanwhile, PTLs 3 and 4 disclose that in order to suppress the hardening of rubber resulting from the running of the tire, an oil absorbent having an oil absorbing power of twice or more a process oil is blended together with a process oil into a rubber composition. It is also disclosed that as the oil absorbent, porous vinyl-based polymer gel particles obtained by the low-crosslinking polymerization of a polymer having high affinity to a process oil are used. However, in these literatures, the oil absorbent has the function of retaining the process oil in a rubber composition over a long period of time, and it is not disclosed that snow performance and wet performance are improved by the oil-absorbed polymer gel particles.

CITATION LIST

Patent Literature

PTL 1: JP-A-2010-209174
PTL 2: JP-A-H1-163228
PTL 3: JP-A-H11-172048
PTL 4: JP-A-2000-247105

SUMMARY OF INVENTION

Technical Problem

In light of the above points, an object of the invention is to provide a rubber composition for a tire tread, which is capable of improving snow performance and wet performance.

Solution to Problem

A rubber composition for a tire tread according to this embodiment includes a rubber component containing a natural rubber, a styrene-butadiene rubber, and a polybutadiene rubber; oil-absorbent polymer particles having a glass transition temperature of −70 to −20° C. and an oil absorption of 100 to 1,500 ml/100 g; an oil; and silica. The content of the oil-absorbent polymer particles is 0.5 to 25 parts by mass per 100 parts by mass of the rubber component.

A pneumatic tire according to this embodiment includes a tread rubber including the above rubber composition.

Advantageous Effects of Invention

According to this embodiment, snow performance and wet performance can be improved.

DESCRIPTION OF EMBODIMENTS

Hereinafter, matters relevant to the practice of the invention will be described in detail.

The rubber composition according to this embodiment is a blend of a rubber component containing a natural rubber, a styrene-butadiene rubber, and a polybutadiene rubber; oil-absorbent polymer particles; an oil; and silica.

The rubber component contains a natural rubber (NR), a styrene-butadiene rubber (SBR), and a polybutadiene rubber (BR). The ratio of these three components is not particularly limited. For example, as one embodiment, 100 parts by mass of the rubber component may contain 5 to 40 parts by mass of the natural rubber, 20 to 90 parts by mass of the styrene-butadiene rubber, and 5 to 45 parts by mass of the polybutadiene rubber, may contain 5 to 35 parts by mass of the natural rubber, 40 to 80 parts by mass of the styrene-butadiene rubber, and 15 to 45 parts by mass of the polybutadiene rubber, or may alternatively contain 10 to 35 parts by mass of the natural rubber, 45 to 60 parts by mass of the styrene-butadiene rubber, and 20 to 40 parts by mass of the polybutadiene rubber.

As the styrene-butadiene rubber, in terms of achieving both snow performance and wet performance, it is preferable to use a solution-polymerized styrene-butadiene rubber (SSBR). In addition, as the styrene-butadiene rubber, it is also possible to use a modified styrene-butadiene rubber (modified SBR) modified with a functional group that interacts with silanol groups on the silica surface, and, as one embodiment, a modified SSBR may also be used. Examples of functional groups of the modified SBR include an amino group, an alkoxyl group, and a hydroxy group. These functional groups may be introduced alone, or alternatively it is also possible to introduce a combination of two or more kinds. That is, as the modified SBR, one having at least one functional group selected from the group consisting of an amino group, an alkoxyl group, and a hydroxy group can be mentioned. The functional group may be introduced into the molecular terminals or may alternatively be introduced into the molecular chain.

Incidentally, the rubber component may be composed only of the above NR, SBR, and BR. However, as long as the advantageous effects of the invention are not impaired, other diene-based rubbers may also be contained.

As the oil-absorbent polymer particles, polymer particles having a glass transition temperature of −70 to −20° C. and an oil absorption of 100 to 1,500 ml/100 g are used. When such oil-absorbent polymer particles are blended into the rubber component containing NR/SBR/BR together with silica and an oil, snow performance and wet performance can be improved in a well-balanced manner. The reasons therefor are believed to be as follows. That is, the oil-absorbent polymer particles are gelled (i.e., swollen) with the oil, and the gelled oil-absorbent polymer particles form, as a dispersed phase dispersed in a matrix (continuous phase) comprising the rubber component, a filler non-localized phase containing no filler (silica, etc.). As a result, the hysteresis loss of the rubber composition can be increased, presumably resulting in improved wet performance. In addition, the filler non-localized phase is also a micro-flexible phase and facilitates adhering to the road surface. Further, because the filler non-localized phase has a low glass transition temperature, the adhesion to the road surface in a low temperature region is enhanced. This presumably results in improved snow performance.

The oil-absorbent polymer particles have an oil absorption of 100 to 1,500 ml/100 g. When such oil-absorbent polymer particles having a high oil absorption are used, snow performance and wet performance can be improved in a well-balanced manner. In addition, because the oil absorption is 1,500 ml/100 g or less, a decrease in abrasion resistance can be suppressed. The oil absorption of the oil-absorbent polymer particles is preferably 300 to 1,300 ml/100 g, more preferably 500 to 1,200 ml/100 g, and may also be 800 to 1,200 ml/100 g. Here, the oil absorption is the maximum amount of oil that can be absorbed per 100 g of the oil-absorbent polymer particles (oil absorption at saturation) and is a value measured in accordance with JIS K5101-13-1.

The oil-absorbent polymer particles have a glass transition temperature (Tg) of −70 to −20° C. When such oil-absorbent polymer particles having a low glass transition temperature are used, the adhesion to the road surface in a low temperature region can be enhanced to improve snow performance. In addition, a glass transition temperature of −70° C. or more is advantageous in improving wet performance. The glass transition temperature of the oil-absorbent polymer particles is preferably −60 to −40° C. and may also be −60 to −50° C. Here, the glass transition temperature is a value measured using differential scanning calorimetry (DSC) in accordance with JIS K7121 (temperature rise rate: 20° C./min).

As the oil-absorbent polymer particles, it is preferable to use particles of a polymer having a molecular weight distribution (Mw/Mn) of less than 3.0. When the molecular weight distribution is less than 3.0, deterioration of low heat generation performance can be suppressed, and deterioration of the rolling resistance performance of the tire can be suppressed. The molecular weight distribution is preferably 2.0 or less, more preferably 1.5 or less, and may also be 1.2 or less. The lower limit of the molecular weight distribution is not particularly set, and should be 1 or more and may also be 1.1 or more. Here, the molecular weight distribution is the ratio of the weight average molecular weight (Mw) relative to the number average molecular weight (Mn) of the polymer. Mn and Mw are values calculated in terms of standard polystyrene using GPC (gel permeation chromatography) and can be determined as follows, for example. 0.2 mg of a measurement sample dissolved in 1 mL of THF is, after filter penetration using "LC-20DA" manufactured by Shimadzu Corporation, passed through columns ("PL Gel 3 μm Guard×2" manufactured by Polymer Laboratories) at a temperature of 40° C. and a flow rate of 0.7 mL/min, followed by detection using "RI Detector" manufactured by Spectra System.

The average particle size of the oil-absorbent polymer particles (average particle size with no oil absorbed) is not particularly limited, and may be, for example, 10 to 1,000 μm, 100 to 800 μm, or 300 to 700 μm. Here, the average particle size can be determined as follows. Using an image obtained by observation under a scanning electron microscope (SEM), the diameters of randomly sampled 50 particles are measured, and their arithmetic average is determined as the average particle size. The diameter of a particle can be determined as follows, for example. Using an image processing software "Image-Pro Plus" manufactured by Media Cybernetics, the length of a line connecting two points on the circumference and passing through the center of gravity of the particle is measured at 2° intervals, and the average of the measured values can be used as the diameter.

In one embodiment, the oil-absorbent polymer particles may be formed from a copolymer having a styrene unit and an ethylene unit as repeating units. In addition, in one embodiment, the oil-absorbent polymer particles may also be porous particles.

As oil-absorbent polymer particles having such properties, "Aqua N-Cap" is commercially available from Meitoh Kasei Co., Ltd., and can be preferably used. Aqua N-Cap is a granular powder formed from a thermoplastic block copolymer and is oil-absorbent thermoplastic polymer particles. Aqua N-Cap is lipophilic and hydrophobic, that is, absorbs oil but does not absorb water, and is capable of oil micro-encapsulation.

The content of the oil-absorbent polymer particles in the rubber composition is preferably 0.5 to 25 parts by mass per 100 parts by mass of the rubber component. When the content is 0.5 parts by mass or more, snow performance and wet performance can be improved, while when the content is 25 parts by mass or less, a decrease in abrasion resistance can be suppressed. The content of the oil-absorbent polymer particles is preferably 1 to 20 parts by mass, more preferably 2 to 15 parts by mass, per 100 parts by mass of the rubber component.

As the oil, any of various oils blended into a rubber composition can be used. Preferably, as the oil, a mineral oil containing a hydrocarbon as a main component is used. That is, it is preferable to use at least one mineral oil selected from the group consisting of paraffinic oils, naphthenic oils, and aromatic oils.

In terms of enhancing the effect of achieving both snow performance and wet performance, it is preferable that the content ratio between the oil and the oil-absorbent polymer particles is set as follows. That is, it is preferable that the oil content (A) is 2 to 15 times the oil-absorbent polymer particle content (B) on mass basis ((A)/(B)=2 to 15). (A)/(B) is more preferably 3 to 12.

In one embodiment, the oil-absorbent polymer particles and the oil may be blended as an oil-polymer composite obtained by absorbing the oil into the oil-absorbent polymer particles. That is, it is possible that oil-absorbent polymer particles and an oil are previously mixed to absorb the oil into the oil-absorbent polymer particles, and the resulting oil-containing oil-absorbent polymer particles are added to a rubber component and mixed.

Incidentally, the content of the oil contained in the rubber composition is not particularly limited, and may be, for example, 20 to 50 parts by mass or 25 to 40 parts by mass per 100 parts by mass of the rubber component.

In the rubber composition according to this embodiment, silica is blended as a reinforcing filler (i.e., filler). As the silica, for example, it is preferable to use wet silica, such as wet-precipitated silica or wet-gelled silica. The content of the silica is not particularly limited, but is preferably 70 to 130 parts by mass, more preferably 80 to 100 parts by mass, per 100 parts by mass of the rubber component. Incidentally, a silane coupling agent, such as sulfide silane or mercapto silane, may also be used together with silica, and the amount thereof blended is preferably 2 to 20 mass % relative to the amount of silica blended.

In the rubber composition according to this embodiment, it is preferable that the reinforcing filler contains silica as a main component, that is, it is preferable that more than 50 mass % of the reinforcing filler is silica. It is more preferable that 80 mass % or more of the reinforcing filler is silica. The content of the reinforcing filler in the rubber composition is not particularly limited, and may be 70 to 150 parts by mass or 80 to 130 parts by mass per 100 parts by mass of the rubber component. Incidentally, the reinforcing filler may also contain carbon black together with silica.

In the rubber composition according to this embodiment, in addition to the components described above, formulated chemicals used in the usual rubber industry, such as zinc oxide, stearic acid, waxes, antioxidants (amine-ketone-based, aromatic secondary amine-based, phenol-based, imidazole-based, etc.), vulcanizers, and vulcanization accelerators (guanidine-based, thiazole-based, sulfenamide-based, thiuram-based, etc.), can be suitably blended within the usual ranges.

Examples of the vulcanizers include sulfur such as powder sulfur, precipitated sulfur, colloidal sulfur, insoluble sulfur, and highly dispersed sulfur. The amount thereof blended is not particularly limited, but is preferably 0.1 to 5 parts by mass, more preferably 0.5 to 3 parts by mass, per 100 parts by mass of the rubber component. In addition, the amount of vulcanization accelerator blended is preferably 0.1 to 5 parts by mass, more preferably 0.5 to 3 parts by mass, per 100 parts by mass of the rubber component.

The rubber composition according to this embodiment can be produced by kneading in the usual manner using a mixer that is usually used, such as a Banbury mixer, a kneader, or a roll. For example, it is possible that in the non-productive mixing step, oil-absorbent polymer particles, an oil, silica, and also other additives excluding a vulcanizer and a vulcanization accelerator are added to a rubber component and mixed, and subsequently, in the productive mixing step, a vulcanizer and a vulcanization accelerator are added to the obtained mixture and mixed, thereby preparing a rubber composition.

The rubber composition thus obtained is used for a tread rubber that forms the tread of a pneumatic tire. Examples of tires include pneumatic tires of various sizes for various applications, including passenger car tires, heavy-load tires for trucks and buses, and the like. The rubber composition is preferably used for a snow tire (i.e., winter tire). The tread rubber of a pneumatic tire has a two-layer structure including a cap rubber and a base rubber or a monolayer structure in which the two are integrated, and the rubber composition is preferably used for a rubber forming the tread. That is, in the case of a monolayer structure, it is preferable that the tread rubber includes the above rubber composition, while in the case of a two-layer structure, it is preferable that the cap rubber includes the above rubber composition.

The method for producing a pneumatic tire is not particularly limited. For example, it is possible that the rubber composition is formed into a predetermined shape by extrusion in the usual manner to prepare an unvulcanized tread rubber member, and then the tread rubber member is combined with other members to prepare an unvulcanized tire (green tire), followed by vulcanization molding at 140 to 180° C., for example, thereby producing a pneumatic tire.

EXAMPLES

Hereinafter, examples of the invention will be shown, but the invention is not limited to these examples.

Using a Banbury mixer, following the formulation (part by mass) shown in Table 1 below, first, in the non-productive mixing step, agents to be blended excluding sulfur and a vulcanization accelerator were added to a rubber component and kneaded (discharge temperature=160° C.), and subsequently, in the productive mixing step, sulfur and a vulcanization accelerator were added to the obtained mixture and kneaded (discharge temperature=90° C.), thereby preparing a rubber composition for a tire tread. The details of the components in Table 1 are as follows.

NR: Natural rubber, RSS#3
SBR: Alkoxyl- and amino-terminated modified solution-polymerized SBR, "HPR350" manufactured by JSR Corporation
BR: "BR150B" manufactured by Ube Industries, Ltd.
Carbon black: "SEAST KH (N339)" manufactured by Tokai Carbon Co., Ltd.
Silica: "Nipsil Q" manufactured by Tosoh Silica Corporation
Paraffinic oil: "PROCESS P200" manufactured by JX Nippon Oil & Energy Corporation
Aromatic oil: "PROCESS NC140" manufactured by JX Nippon Oil & Energy Corporation
Silane coupling agent: "Si69" manufactured by Evonik
Oil-absorbent polymer particles: "Aqua N-Cap" manufactured by Meitoh Kasei Co., Ltd. (oil absorption: 1,000 ml/100 g, Tg: −51° C., average particle size: 500 Mw: 99,000, Mn: 85,000, Mw/Mn: 1.2)
Polymethyl methacrylate: "Polymethyl Methacrylate" manufactured by Tokyo Chemical Industry Co., Ltd. (oil absorption: 46.8 ml/100 g, Tg: 90° C.)
Silicone resin powder: "Tospearl 2000B" manufactured by Momentive Performance Materials Japan LLC (oil absorption: 10.0 ml/100 g, average particle size: 7 μm)
Oil gelling agent: N-Lauroyl-L-glutamic acid-$\alpha,\gamma$-di-n-butylamide, "COAGULAN GP-1" manufactured by Ajinomoto Co., Inc.
Stearic acid: "LUNAC S-20" manufactured by Kao Corporation
Zinc oxide: "Zinc Oxide No. 1" manufactured by Mitsui Mining & Smelting Co., Ltd.
Wax: "OZOACE 0355" manufactured by Nippon Seiro Co., Ltd.
Antioxidant: "Nocrac 6C" manufactured by Ouchi Shinko Chemical Industrial Co., Ltd.
Vulcanization accelerator: "Nocceler D" manufactured by Ouchi Shinko Chemical Industrial Co., Ltd.
Sulfur: "Powder Sulfur" manufactured by Tsurumi Chemical Industry Co., Ltd.

The obtained rubber composition was vulcanized at 160° C. for 30 minutes to give a test piece of a predetermined shape, and the abrasion resistance was evaluated. In addition, using each rubber composition, a pneumatic radial tire for passenger cars was produced. The tire size was set at 215/45ZR17, and each rubber composition was applied to the tread rubber and subjected to vulcanization molding in the usual manner to produce a tire. The rolling resistance performance, snow performance, and wet performance of the obtained tire were evaluated. The evaluation methods are as follows.

Abrasion Resistance: In accordance with JIS K6264, using a Lambourn abrasion tester manufactured by Iwamoto Seisakusho Co., Ltd., the abrasion loss was measured under the conditions of a load of 40 N and a slip ratio of 30%, and the reciprocal of abrasion loss was expressed as an index taking the value of Comparative Example 1 as 100. A larger index indicates less abrasion loss and better abrasion resistance.

Rolling Resistance Performance: Using a rolling resistance measurement drum tester, the rolling resistance of each tire was measured under the conditions of a pneumatic pressure of 230 kPa, a load of 4,410 N, a temperature of 23° C., and 80 km/h. The reciprocal of rolling resistance was expressed as an index taking the value of Comparative Example 1 as 100. A larger index indicates lower rolling resistance and better fuel efficiency.

Snow Performance: Four tires were mounted on a passenger car, run on a snow-covered road (temperature: −15±3° C.) at 60 km/h, and then, under ABS control, slowed down to 20 km/h, and the braking distance at this time was measured (average of n=10). The reciprocal of braking distance was expressed as an index taking the value of Comparative Example 1 as 100. A larger index indicates a shorter braking distance and better snow performance.

Wet Performance: Four tires were mounted on a passenger car and run on a road watered to a depth of 2 to 3 mm. The friction coefficient was measured at 100 km/h to evaluate the wet grip performance, and the result was expressed as an index taking Comparative Example 1 as 100. A larger index indicates a larger friction coefficient and better wet grip properties.

TABLE 1

|  | Comparative Examples | | | | | Examples | | | | | | |
| --- | --- | --- | --- | --- | --- | --- | --- | --- | --- | --- | --- | --- |
|  | 1 | 2 | 3 | 4 | 5 | 1 | 2 | 3 | 4 | 5 | 6 | 7 |
| Formulation (part by mass) | | | | | | | | | | | | |
| NR | 30 | 30 | 30 | 30 | 30 | 30 | 30 | 30 | 10 | 10 | 30 | 30 |
| SBR | 50 | 50 | 50 | 50 | 50 | 50 | 50 | 50 | 50 | 50 | 50 | 50 |
| BR | 20 | 20 | 20 | 20 | 20 | 20 | 20 | 20 | 40 | 40 | 20 | 20 |
| Carbon black | 10 | 10 | 10 | 10 | 10 | 10 | 10 | 10 | 10 | 10 | 10 | 10 |
| Silica | 90 | 90 | 90 | 90 | 90 | 90 | 90 | 90 | 90 | 90 | 70 | 110 |
| Paraffinic oil | 30 | 30 | 30 | 30 | 30 | 30 | 30 | 30 | 30 | 10 | 10 | 10 |
| Aromatic oil | — | — | — | — | — | — | — | — | — | 20 | 20 | 20 |
| Silane coupling agent | 9.0 | 9.0 | 9.0 | 9.0 | 9.0 | 9.0 | 9.0 | 9.0 | 9.0 | 9.0 | 9.0 | 9.0 |
| Oil-absorbent polymer particles | — | — | — | — | 30 | 2.5 | 5.0 | 10 | 10 | 10 | 10 | 10 |
| Polymethyl methacrylate | — | 5.0 | — | — | — | — | — | — | — | — | — | — |
| Silicone resin powder | — | — | 5.0 | — | — | — | — | — | — | — | — | — |
| Oil gelling agent | — | — | — | 5.0 | — | — | — | — | — | — | — | — |
| Stearic acid | 2.0 | 2.0 | 2.0 | 2.0 | 2.0 | 2.0 | 2.0 | 2.0 | 2.0 | 2.0 | 2.0 | 2.0 |
| Zinc oxide | 2.0 | 2.0 | 2.0 | 2.0 | 2.0 | 2.0 | 2.0 | 2.0 | 2.0 | 2.0 | 2.0 | 2.0 |
| Wax | 2.0 | 2.0 | 2.0 | 2.0 | 2.0 | 2.0 | 2.0 | 2.0 | 2.0 | 2.0 | 2.0 | 2.0 |
| Antioxidant | 2.0 | 2.0 | 2.0 | 2.0 | 2.0 | 2.0 | 2.0 | 2.0 | 2.0 | 2.0 | 2.0 | 2.0 |
| Vulcanization accelerator | 1.5 | 1.5 | 1.5 | 1.5 | 1.5 | 1.5 | 1.5 | 1.5 | 1.5 | 1.5 | 1.5 | 1.5 |
| Sulfur | 1.0 | 1.0 | 1.0 | 1.0 | 1.0 | 1.0 | 1.0 | 1.0 | 1.0 | 1.0 | 1.0 | 1.0 |
| Evaluation (index) | | | | | | | | | | | | |
| Abrasion resistance | 100 | 98 | 95 | 98 | 85 | 100 | 100 | 100 | 102 | 105 | 102 | 103 |
| Rolling resistance performance | 100 | 102 | 103 | 100 | 108 | 102 | 105 | 107 | 105 | 105 | 106 | 103 |
| Snow performance | 100 | 90 | 95 | 90 | 120 | 103 | 105 | 110 | 120 | 115 | 112 | 108 |
| Wet performance | 100 | 95 | 90 | 85 | 120 | 103 | 105 | 110 | 105 | 120 | 107 | 115 |

The results are as shown in Table 1. As compared with Comparative Example 1, which is a control, in Comparative Example 4 where an amino acid-based oil gelling agent was blended, the snow performance and wet performance deteriorated. In Comparative Examples 2 and 3, the oil absorption of the added polymethyl methacrylate or silicone resin powder was low, and the snow performance and wet performance deteriorated. In Comparative Example 5, the amount of oil-absorbent polymer particles blended was too large, and the abrasion resistance was impaired.

In contrast, in Examples 1 to 7, the snow performance and wet performance improved in a well-balanced manner without loss in abrasion resistance, and the rolling resistance performance also improved.

Some embodiments of the invention have been described above. However, these embodiments are presented as examples and not intended to limit the scope of the invention. These embodiments can be practiced in other various modes, and, without departing from the gist of the invention, various omissions, substitutions, and changes can be made thereto. These embodiments, as well as omissions, substitutions, and changes thereto, for example, fall within the scope and gist of the invention, and also fall within the scope of the claimed invention and its equivalents.

The invention claimed is:

1. A rubber composition for a tire tread, comprising:
   a rubber component containing a natural rubber, a styrene-butadiene rubber, and a polybutadiene rubber;
   oil-absorbent polymer particles having a glass transition temperature of −70 to −20° C. and an oil absorption of 100 to 1,500 ml/100 g;
   an oil; and
   silica,
   the content of the oil-absorbent polymer particles being 0.5 to 25 parts by mass per 100 parts by mass of the rubber component.

2. The rubber composition for a tire tread according to claim 1, wherein the oil-absorbent polymer particles are formed from a polymer having a molecular weight distribution of less than 3.0.

3. The rubber composition for a tire tread according to claim 1, wherein the content of the oil is 2 to 15 times the content of the oil-absorbent polymer particles on mass basis.

4. The rubber composition for a tire tread according to claim 1, wherein the content of the silica is 70 to 130 parts by mass per 100 parts by mass of the rubber component.

5. The rubber composition for a tire tread according to claim 1, wherein 100 parts by mass of the rubber component contains 5 to 40 parts by mass of the natural rubber, 20 to 90 parts by mass of the styrene-butadiene rubber, and 5 to 45 parts by mass of the polybutadiene rubber.

6. The rubber composition for a tire tread according to claim 1, wherein the styrene-butadiene rubber is a modified styrene-butadiene rubber modified with a functional group that interacts with silanol groups on the silica surface.

7. The rubber composition for a tire tread according to claim 1, wherein the oil-absorbent polymer particles have been gelled with the oil, and the gelled oil-absorbent polymer particles form, as a dispersed phase dispersed in a matrix comprising the rubber component, a filler non-localized phase containing no filler.

8. A pneumatic tire comprising a tread rubber including the rubber composition according to claim 1.

9. The pneumatic tire according to claim 8, being a winter tire.

* * * * *